United States Patent
Bello et al.

(10) Patent No.: US 8,607,232 B2
(45) Date of Patent: Dec. 10, 2013

(54) IDENTIFYING A TRANSIENT THREAD AND EXCLUDING THE TRANSIENT THREAD FROM A PROCESSOR LOAD CALCULATION

(75) Inventors: Adekunle Bello, Pfugerville, TX (US); Krishna Reddy Nandyala Siva Rama, Austin, TX (US); Srinivasa M. Rao, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/944,522

(22) Filed: Nov. 11, 2010

(65) Prior Publication Data

US 2012/0124582 A1    May 17, 2012

(51) Int. Cl.
G06F 9/46 (2006.01)
(52) U.S. Cl.
USPC .......................... 718/100; 718/102; 718/104
(58) Field of Classification Search
USPC ................ 718/1–105; 709/223–226
See application file for complete search history.

(56) References Cited

U.S. PATENT DOCUMENTS

| 6,735,769 | B1 * | 5/2004 | Brenner et al. | 718/105 |
| 7,624,395 | B2 | 11/2009 | Dostert | |
| 2005/0081183 | A1 * | 4/2005 | Accapadi et al. | 717/100 |
| 2005/0235136 | A1 * | 10/2005 | Barsotti et al. | 713/1 |
| 2006/0136176 | A1 * | 6/2006 | Lee et al. | 702/186 |
| 2006/0143708 | A1 * | 6/2006 | Garvey et al. | 726/23 |
| 2007/0288728 | A1 * | 12/2007 | Tene et al. | 712/227 |
| 2008/0147357 | A1 | 6/2008 | Truter | |
| 2009/0059951 | A1 * | 3/2009 | Hayashi | 370/458 |
| 2010/0058351 | A1 * | 3/2010 | Yahagi | 718/104 |

OTHER PUBLICATIONS

Suda et al., Accurate Measurements and Precise Modeling of Power Dissipation of CUDA Kernels Toward Power Optimized High Performance CPUJ-GPU Computing, 2009, International Conference on Parallel and Distributed Computing, Applications and Technologies, pp. 432-438.

* cited by examiner

*Primary Examiner* — Abdullah Al Kawsar
(74) *Attorney, Agent, or Firm* — Yee & Associates, P.C.; Art Samodovitz

(57) ABSTRACT

A method, computer system, and computer program product for identifying a transient thread. A thread of a process is placed in a run queue associated with a processor. Data is added to the thread indicating a time that the thread was placed into the run queue.

23 Claims, 5 Drawing Sheets

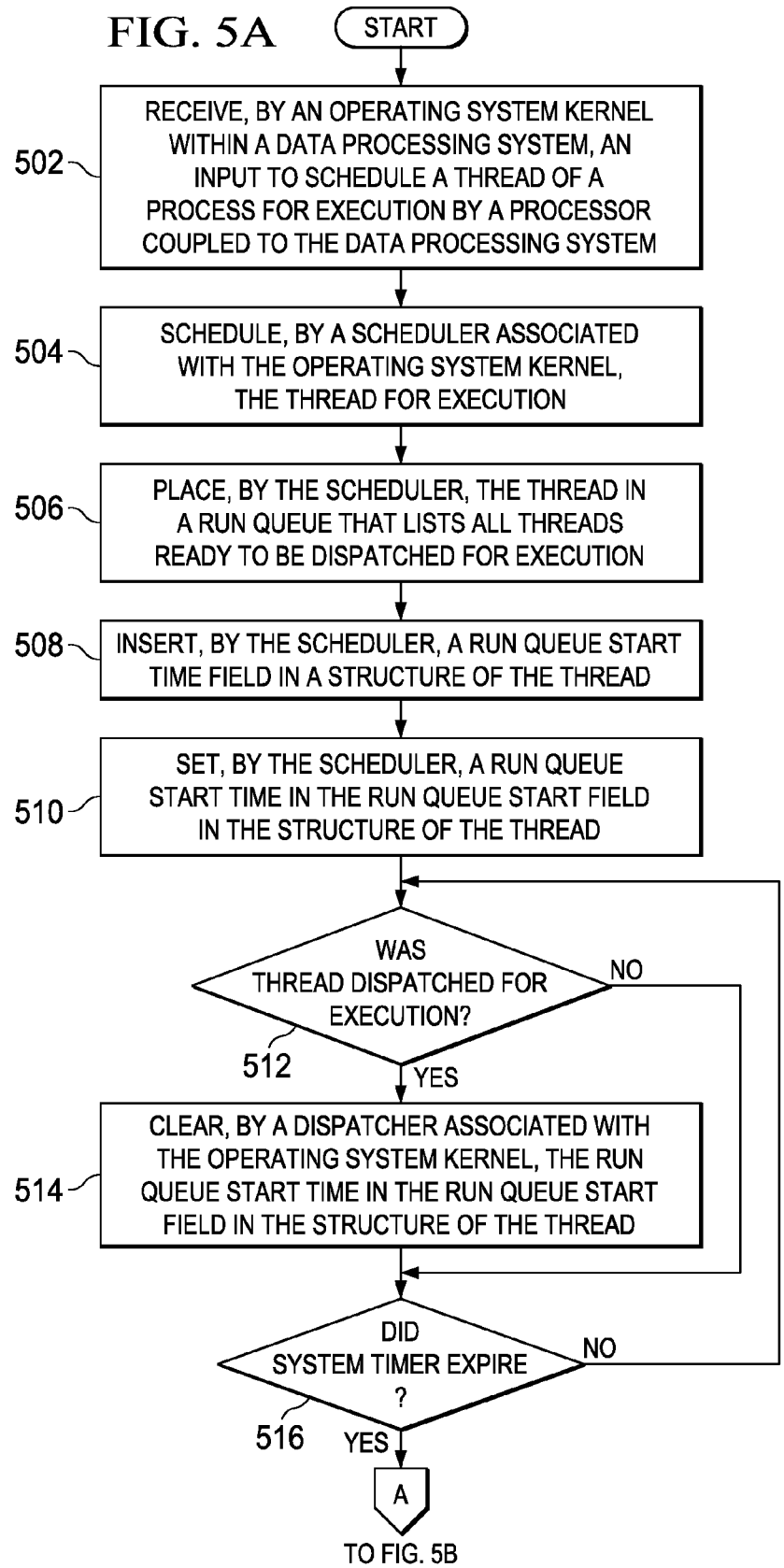

IDENTIFYING A TRANSIENT THREAD AND EXCLUDING THE TRANSIENT THREAD FROM A PROCESSOR LOAD CALCULATION

BACKGROUND

1. Field

The disclosure relates to a method, computer system, and computer program product for calculating a more accurate processor load average by identifying threads in a processor run-queue, which are active for only transient periods of time, and not including the identified transient threads in a processor load average calculation.

2. Description of the Related Art

Today's operating systems calculate processor loads. A processor load is a measure of the amount of work that a processor performs. For example, an idle processor may have a processor load of zero. Each thread using or waiting for the processor may increment the processor load by one, for example. Higher processor load numbers may indicate a problem or a processor overload condition.

SUMMARY

According to one embodiment of the present invention, a method for identifying a transient thread is provided. A computer places a thread of a process in a run queue associated with a processor. The computer adds data to the thread indicating a time that the thread was placed into the run queue.

According to another embodiment of the present invention, a computer system for identifying a transient thread is provided. The computer system includes one or more processors, one or more computer-readable memories, and one or more computer-readable, tangible storage devices. At least one of the one or more storage devices stores program instructions, which when executed by at least one of the one or more processors via at least one of the one or more memories place a thread of a process in a run queue associated with a processor and add data to the thread indicating a time that the thread was placed into the run queue.

According to a further embodiment of the present invention, a computer program product for identifying a transient thread is provided. The computer program product includes one or more computer-readable, tangible storage devices and program instructions stored on at least one of the one or more storage devices to place a thread of a process in a run queue associated with a processor and add data to the thread indicating a time that the thread was placed into the run queue.

BRIEF DESCRIPTION OF THE SEVERAL VIEWS OF THE DRAWINGS

FIGS. 5A and 5B are a flowchart illustrating a process for calculating a processor load in accordance with an illustrative embodiment.

DETAILED DESCRIPTION

Figure 1:
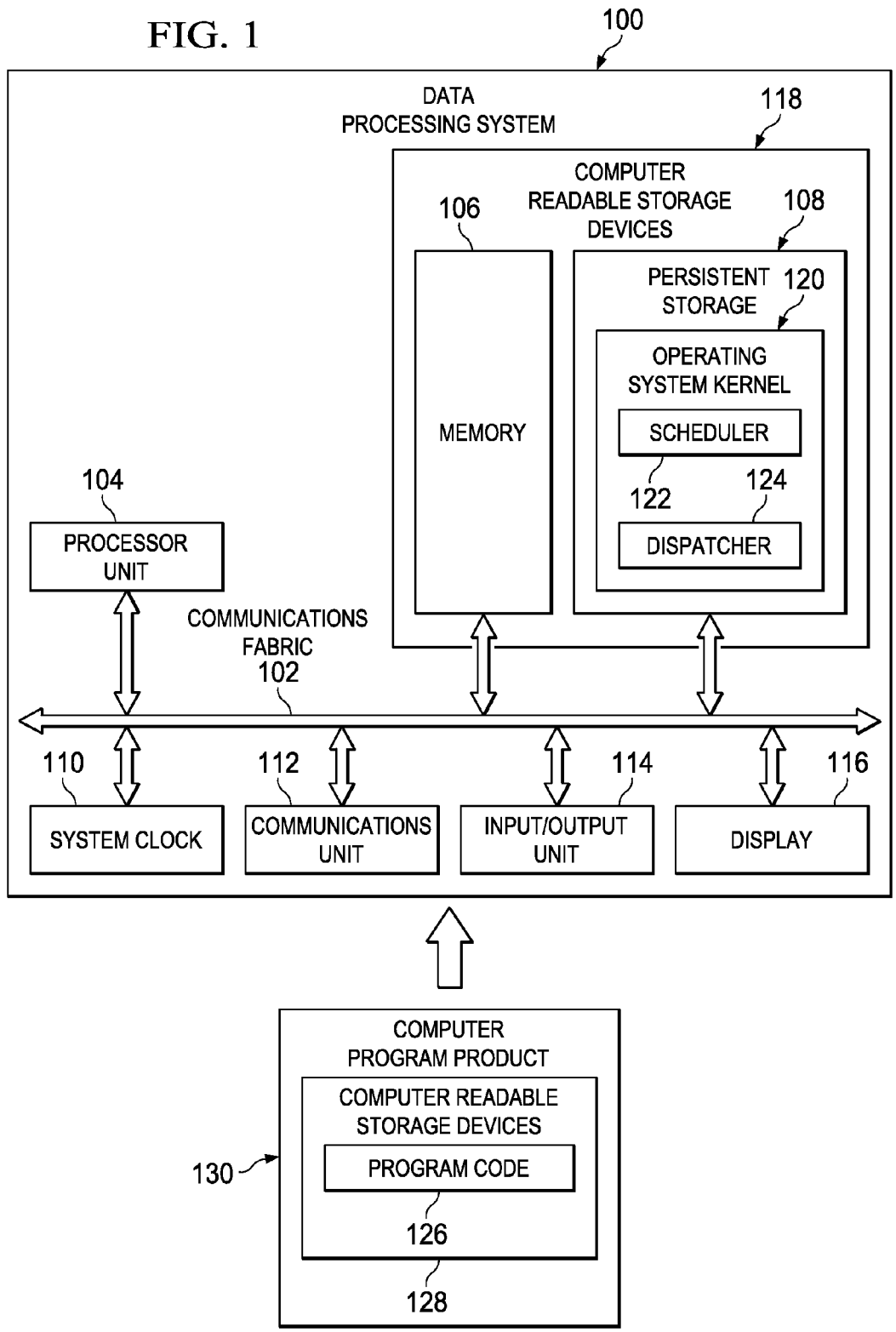
FIG. 1 is a diagram of a data processing system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer-readable medium(s) may be utilized. A computer-readable storage device may be, for example, but not limited to, an electronic, magnetic, optical, or semiconductor system, apparatus, or device, or any suitable combination of the foregoing. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage device may be any tangible medium that can store a program for use by or in connection with an instruction execution system, apparatus, or device. The term "computer-readable storage device" does not include a signal propagation medium, such as a copper cable, optical fiber, or wireless transmission media. Also, the term "computer-readable storage device" excludes signals per se and carrier waves per se.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIG. 1, a diagram of data processing environments is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 depicts a diagram of a data processing system in which illustrative embodiments may be implemented. Data processing system 100 is an example of a computer in which computer readable program instructions or code implementing processes of illustrative embodiments may be located. However, it should be noted that data processing system 100 may, for example, be personal digital assistant (PDA), a cellular telephone, a gaming device, set-top box, or any other type of electronic device that includes one or more processors. In this illustrative example, data processing system 100 includes communications fabric 102, which provides communications between processor unit 104, memory 106, persistent storage 108, system clock 110, communications unit 112, input/output (I/O) unit 114, and display 116.

Processor unit 104 serves to execute instructions for software applications or programs that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of computer readable storage devices 118. Memory 106, in these examples, may, for example, be a random access memory, or any other suitable computer readable storage device. Persistent storage 108 may take various forms, depending on the particular implementation. For example, persistent storage 108 may contain one or more devices. For example, persistent storage 108 may be a hard drive, a flash memory, a rewritable optical disk, a rewritable magnetic tape, or some combination of the above. The media used by persistent storage 108 may be removable. For example, a removable hard drive may be used for persistent storage 108.

Persistent storage 108 stores operating system kernel 120. An operating system kernel is a fundamental component of most computer operating systems. The kernel is a bridge between applications and the actual data processing done at the hardware level. In other words, the kernel is responsible for communication between hardware and software components. In addition, the kernel is typically responsible for process and task management, memory management, and disk management.

Operating system kernel 120 includes scheduler 122 and dispatcher 124. Scheduler 122 is a component that schedules processes and threads for execution. A computer program comprises a set of computer readable instructions, and a process is the actual execution of those computer readable instructions to perform tasks and/or functions. A process may include one or more threads of execution that may execute instructions concurrently. A thread of execution is a sequential flow of processing that can be scheduled by scheduler 122.

In response to scheduling a thread for execution, scheduler 122 places the thread in a processor run queue, inserts a run queue start time field within the structure of the thread, and sets a run queue start time in the run queue start time field. The run queue start time is the time when scheduler 122 first places the thread in the processor run queue. Dispatcher 124 dispatches threads, which are waiting in the run queue, to be executed by one of the one or more processors in processor unit 104. In addition, in response to a thread being executed by processor unit 104, dispatcher 124 clears the run queue start time in the run queue start time field within the structure of the executed thread by, for example, setting the run queue start time to zero.

Further, scheduler 122 calculates a difference between the run queue start time and a current timestamp of data processing system 100 when the system timer expires. A current timestamp of data processing system 100 may, for example, be determined by system time. System time is measured by system clock 110. System time represents a computer's perception of time passing, which is typically implemented as a count of a number of clock ticks that have transpired since some arbitrary starting point. A timestamp is a sequence of characters that denotes the system time at which a certain event occurred. In this example, the event is the system timer expiring. The system timer may, for example, expire every clock tick of system clock 110. A clock tick may, for example, be equal to ten milliseconds. However, it should be noted that a clock tick may be greater than or less than ten milliseconds depending on illustrative embodiments. Scheduler 122 uses the system timer to schedule threads for execution. In addition, scheduler 122 collects statistical data on the executing process. The statistical data may, for example, include processor uptime, processor load average, run queue load, thread information, memory information, and fault information. Of course, scheduler 122 may collect any statistical data on executing processes required by illustrative embodiments.

System clock 110 is a circuit that emits a continuous stream of precise high and low pulses that are the same length. One clock tick is the amount of time that passes from the start of one high pulse until the start of the next high pulse. System clock 110 is responsible for synchronizing tasks in data processing system 100.

Moreover, in response to scheduler 122 calculating the difference between the run queue start time and the current timestamp of data processing system 100 when the system timer expires, operating system kernel 102 determines whether the thread is a working thread or a transient thread. Operating system kernel 102 determines that the thread is a working thread if the calculated difference between the run queue start time and the current timestamp of data processing system 100 when the system timer expires is greater than or equal to one clock tick of system clock 110. A working thread is a thread of execution in the process that performs useful work. For example, a working thread may execute a series of complex computations or perform a sequence of function calls.

Alternatively, operating system kernel 102 determines that the thread is a transient thread if the calculated difference between the run queue start time and the current timestamp of data processing system 100 when the system timer expires is less than one clock tick of system clock 110. A transient thread is a thread of execution in the process that comes out of sleep mode for a transient period of time, i.e., less than one clock tick, and goes back to sleep mode without performing any useful work.

In response to determining that the thread is a working thread, operating system kernel 102 includes the working thread in a processor load average for one of the one or more processors of processor unit 104. A processor load average is a measure of an amount of work a particular processor performs over a predetermined time interval. The predetermined time interval may, for example, be a one minute, five minute, and/or fifteen minute time interval. Of course, any time interval period may be used by illustrative embodiments. Conversely, in response to determining that the thread is a transient thread, operating system kernel 102 excludes the transient thread from the processor load average for processor unit 104. Operating system kernel 102 calculates the processor load average for processor unit 104 using only working threads and excluding all identified transient threads of the process.

Communications unit 112, in this example, provides for communication with other data processing systems or devices. In this example, communications unit 112 is a network interface card. Communications unit 112 may provide communications through the use of either or both physical and wireless communications links.

Input/output unit 114 allows for the input and output of data with other devices that may be connected to data processing system 100. For example, input/output unit 114 may provide a connection for user input through a keyboard, a mouse, and/or some other suitable input device. Further, input/output unit 114 may send output to a printer. Display 116 provides a mechanism to display information to a user.

Instructions for an operating system, applications, and/or programs may be located in computer readable storage devices 118, which are in communication with processor unit 104 through communications fabric 102. In these illustrative examples, the instructions are in a functional form on persistent storage 108. These instructions may be loaded into memory 106 for running by processor unit 104. The processes of the different embodiments may be performed by processor unit 104 using computer implemented instructions, which may be located in a memory, such as memory 106.

These instructions are referred to as program code, program instructions, or computer readable program instructions that may be read and run by processor unit 104. The program code, in the different embodiments, may be embodied on different physical or computer readable storage devices, such as memory 106 or persistent storage 108.

Program code 126 is located in a functional form on one or more computer readable storage devices 128, any of which are selectively removable and may be loaded onto or transferred to data processing system 100 for running by processor unit 104. Operating system kernel 120, scheduler 122, and/or dispatcher 124 may represent examples of program code 126 in alternate illustrative embodiments. Program code 126 and computer readable storage devices 128 form computer program product 130.

In some illustrative embodiments, program code 126 may be downloaded over a network to persistent storage 108 from another device or data processing system via communications unit 112 for use within data processing system 100. For instance, program code stored in a computer readable storage device in a server data processing system may be downloaded over a network from the server to data processing system 100. The data processing system providing program code 126 may be a server computer, a client computer, or some other device capable of storing and transmitting program code 126.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being.

For example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing the invention, it was discovered that many operating systems calculate a highly distorted processor load average. These operating systems make no differentiation between threads that do useful work and those threads that merely come out of a sleep mode for a transient period of time only to go back to sleep without doing any useful work. Threads that do useful work are termed "working threads" in this disclosure, and threads that come out of sleep mode and go back to sleep without doing any useful work are termed "transient threads" in this disclosure. As a result of these transient threads, a data processing system may be idle, but performance statistics tools may indicate high processor load averages. This problem of indicating high processor load averages when a data processing system is idle may be compounded by a virtual processor management feature. Thus, a system administrator relying on a distorted processor load average may be inclined to add more processor units to a data processing system when in reality more processor units are not needed.

Illustrative embodiments provide a method, computer system, and computer program product for calculating a more accurate processor load average by identifying threads in a processor run-queue, which are active for only transient periods of time, and not including the identified transient threads in a processor load average calculation. Illustrative embodiments identify threads of a process that are doing useful work separate from transient threads that are idling by going in and out of a sleep mode without doing any useful work. Illustrative embodiments consider only the working threads in processor load statistics that are used to calculate a more accurate processor load average. A processor load statistic is any statistical data regarding a processor's load.

Illustrative embodiments are able to provide the more accurate processor load average by modifying a structure of the threads to include a new run queue start time field. A scheduler, such as scheduler 122 of FIG. 1, updates this new run queue start time field in the structure of a thread with a current time of the system in response to the scheduler placing the thread in a processor run queue. In response to a dispatcher, such as dispatcher 124 of FIG. 1, dispatching the thread for execution, the dispatcher clears the run queue start time field by, for example, setting the run queue start time to zero in the run queue start time field. At each clock tick, in response to the system timer expiring, the scheduler examines each thread in all of the processor run queues in a system and compares the run queue start time set within the run queue start time field of each thread against the current timestamp of the system.

If the difference between the run queue start time and the current timestamp is more than or equal to one clock tick, the thread is determined to be a working thread and is counted toward the processor load average. Otherwise, if the difference between the run queue start time and the current timestamp is less than one clock tick, the thread is determined to be a transient thread and is not counted toward the processor load average. For example, if a thread goes back to sleep after being executed and then is rescheduled for execution just before or at a same time as a clock tick, that thread will have a run queue start time of less than one clock tick off the current timestamp of the system. As a result, that particular thread will not be counted toward the processor load average. Alternatively, if a thread sits in a processor run queue for an entire clock tick, that thread's run queue start time will be greater than or equal to a clock tick off the current timestamp of the system. Consequently, that particular thread will be counted toward the processor load average.

Thus, illustrative embodiments differentiate between working threads in a processor run queue and transient threads that are short-lived, but run periodically, to provide a more accurate processor load average. Threads on a processor run queue that have not run between clock ticks are what illustrative embodiments use to determine a more accurate view of a run queue backlog. This more accurate run queue backlog metric can advantageously prevent system administrators from mis-sizing systems based on misleading run queue backlog information provided by current performance statistics tools. Hence, illustrative embodiments use a thread's time spent on a processor's run queue to classify a thread as a working thread or a transient thread so as to provide a better metric for calculating processor load.

Figure 2:
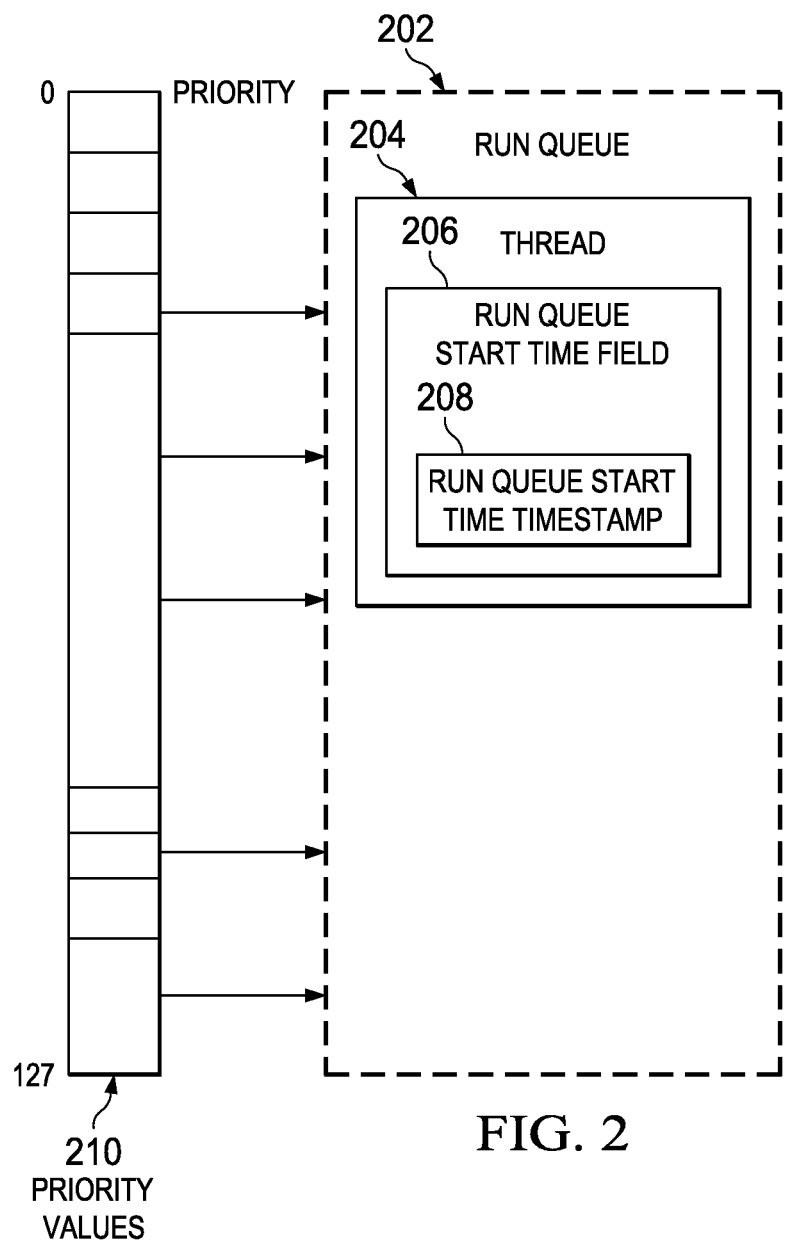
FIG. 2 is a diagram of thread priority in accordance with an illustrative embodiment.

With reference now to FIG. 2, a diagram of thread priority is depicted in accordance with an illustrative embodiment. FIG. 2 symbolically depicts a processor run queue 202. FIG. 2 illustrates how threads with a lower priority value are passed through run queue 202 before threads with a higher priority value. A priority value may also be known as a scheduling priority. FIG. 2 illustrates priority values 210. Priority values 210 in this illustrative example have a range of possible priority values from 0 to 127. However, illustrative embodiments may use a greater or lesser range of possible priority values.

The priority value varies inversely with the importance of an associated thread. For example, a smaller priority value, such as 0, indicates a higher priority thread, whereas a larger priority value, such as 127, indicates a lower priority thread. Typically, when the scheduler is looking for a thread to place in run queue 202, the scheduler selects a thread with the smallest priority value.

Also, it should be noted that each processor in a multiprocessor data processing system, such as each processor in processor unit 104 in FIG. 1, may be associated with its own run queue, such as run queue 202. A scheduler, such as scheduler 122 in FIG. 1, maintains run queue 202 of all threads, such as thread 204, which are ready to be dispatched by a dispatcher, such as dispatcher 124 in FIG. 1, to a processor, such as one of the one or more processors of processor unit 104 in FIG. 1, for execution. In addition, the scheduler determines the priority of threads according to known methods. All dispatchable threads of a given priority occupy a given position in run queue 202.

In response to the scheduler placing thread 204 in run queue 202, the scheduler inserts run queue start time field 206 into a structure of thread 204. Further, the scheduler sets run queue start time timestamp 208 within run queue start time field 206. Run queue start time timestamp 208 represents a time of a data processing system when the scheduler placed thread 204 in run queue 202. The data processing system may, for example, be data processing system 100 in FIG. 1, and the system time may, for example, be provided by a system clock, such as system clock 110 in FIG. 1.

Figure 3:
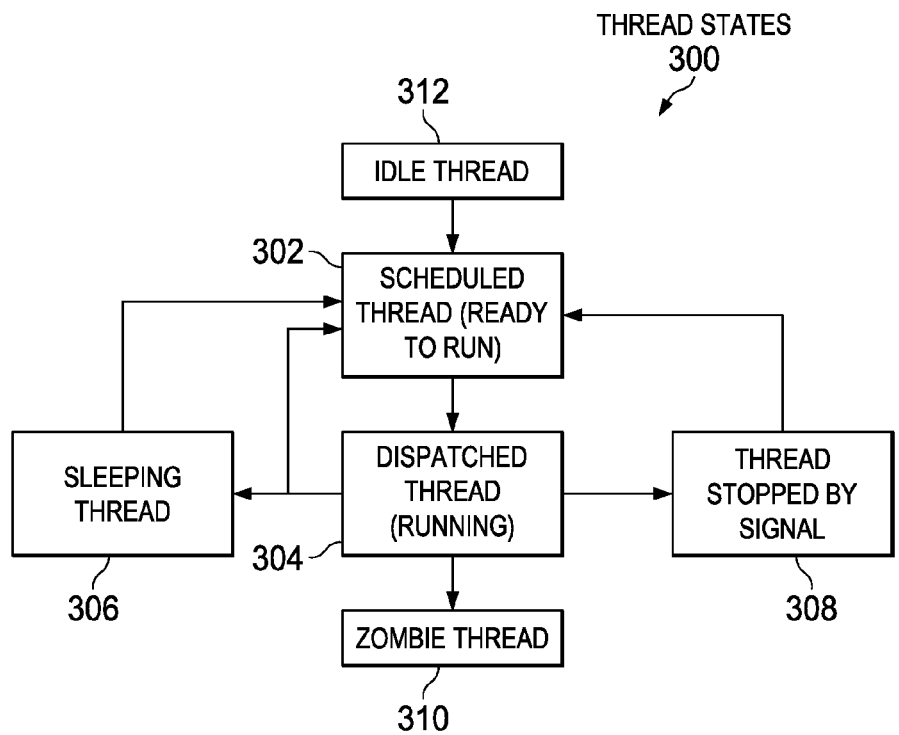
FIG. 3 is a diagram of thread states in accordance with an illustrative embodiment.

With reference now to FIG. 3, a diagram of thread states is depicted in accordance with an illustrative embodiment. Thread states 300 include scheduled thread 302, dispatched thread 304, sleeping thread 306, thread stopped by signal 308, zombie thread 310, and idle thread 312. Scheduled thread 302 may, for example, be thread 204 in FIG. 2. Scheduled thread 302 is a thread of a process that is ready to run. A scheduler, such as scheduler 122 in FIG. 1, places scheduled thread 302 in an appropriate run queue, such as run queue 202 in FIG. 2, associated with a particular processor. Scheduled thread 302 waits in the run queue until a dispatcher, such as dispatcher 124 in FIG. 1, dispatches scheduled thread 302 to the particular processor, such as one of the one or more processors of processor unit 104 in FIG. 1, for execution.

Dispatched thread 304 is a thread that is running. The dispatcher dispatches dispatched thread 304 from the run queue for execution by the processor associated with that particular run queue. Sleeping thread 306 is a thread that finished executing and is in sleep mode. In other words, sleeping thread 306 is inactive and is not in a running mode. In addition, the scheduler has not placed sleeping thread 306 in a processor run queue.

Thread stopped by signal 308 may, for example, be a dispatched thread that has stopped running in response to a signal from an operating system kernel, such as operating system kernel 108 in FIG. 1. A signal is a program function for managing a process. Zombie thread 310 is a dead thread that can no longer run. The operating system kernel deallocates resources allocated to zombie thread 310. In response to deallocating the resources allocated to zombie thread 310, the operating system kernel destroys zombie thread 310. Idle thread 312 is a not yet functional thread that the operating system kernel has newly created.

Figure 4:
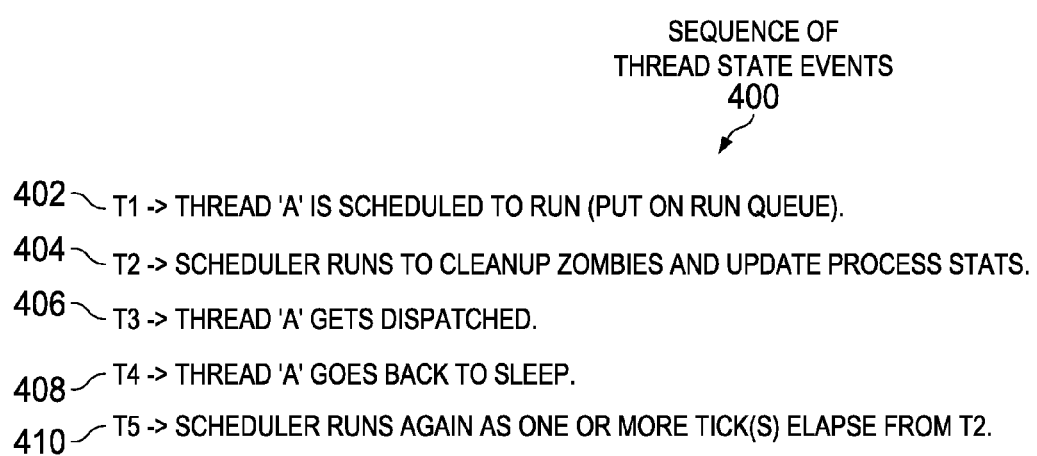
FIG. 4 is an example sequence of thread state events in accordance with an illustrative embodiment.

With reference now to FIG. 4, an example sequence of thread state events is depicted in accordance with an illustrative embodiment. Sequence of thread state events 400 includes thread state events 402, 404, 406, 408, and 410. However, it should be noted that illustrative embodiments may include more or less thread state events.

At thread state event 402, a scheduler, such as scheduler 122 in FIG. 1, schedules thread A, such as thread 204 in FIG. 2, to run. In other words, the scheduler places thread A on a processor run queue ready to be dispatched. At thread state event 404, the scheduler runs to cleanup zombie threads, such as zombie thread 310 in FIG. 3, and to update statistics for a process associated with thread A.

At thread state event 406, a dispatcher, such as dispatcher 124 in FIG. 1, dispatches thread A from the run queue for execution by a processor, such as one of the one or more processors of processor unit 104 in FIG. 1, associated with the run queue. At thread state event 408, thread A enters sleep mode. At thread state event 410, the scheduler runs again as one or more clock ticks of a system clock, such as system clock 110 in FIG. 1, elapse from thread state event 404.

Using thread state events 402, 404, 406, 408, and 410 above, three examples of illustrative embodiments are provided herein. In the first example, it is assumed that thread state events 402 through 408 take less than one clock tick to occur. As a result, the operating system kernel excludes thread A from a working thread count at time T4. In illustrative embodiments, at thread state event 402, the scheduler sets a run queue start time for thread A to time T1. At thread state event 406, in illustrative embodiments, the dispatcher clears the run queue start time in thread A in response to thread A being dispatched for execution. The dispatcher may, for example, clear the run queue start time in thread A by setting the run queue start time to zero. At thread state event 410, the scheduler checks the run queue start time for thread A, finds that the run queue start time has been cleared to zero by the dispatcher, and therefore the operating system kernel does not count thread A toward a processor load.

In the second example, it is assumed that thread state events 402 through 406 take more than one clock tick to occur. In this example, the operating system kernel of illustrative embodiments includes thread A toward a processor load at thread state event 410 because the dispatcher is unable to dispatch thread A for more than one clock tick as all active processing units are busy working on other threads. At thread state event 402, the scheduler sets thread A's run queue start time to time T1. At thread state event 404, the scheduler calculates a difference between time T2 and run queue state time T1, which in this example is less than one clock tick. As a result, the operating system kernel does not count thread A toward a processor load at thread state event 404. However, it should be noted that in this particular example thread state event 410 occurs prior to thread state event 406. In other words, the scheduler runs again prior to the dispatcher dispatching thread A at thread state event 406. As a result, the scheduler calculates the difference between time T5 and run queue start time T1, which difference is more than one clock tick in this particular example. Consequently, at thread state event 410, which occurs prior to thread state event 406 in this example, thread A is counted toward a process load.

In the third example, it is assumed that thread state events 402 through 406 take less than one clock tick to occur and also assume that thread state events 402 through 408 take more than one clock tick to occur. In this example, thread A is not counted toward a processor load at thread state event 410 because thread A at 410 is running. At thread state event 410, thread A's run queue start time is zero because at thread state event 406, the dispatcher cleared the run queue start time. Consequently, in this example the operating system kernel does not count thread A toward a processor load.

It should be noted that in examples one and two above, current approaches will count thread A toward a processor load at both thread state event 404 and thread state event 410. In addition, current approaches will count thread A toward a processor load at thread state event 410 in example three above as well. As a result, current approaches will lead to reporting an erroneously high number of runnable threads. However, illustrative embodiments will not count thread A toward a processor load in any of the examples above, except at thread state event 410 in example two.

Figure 5B:
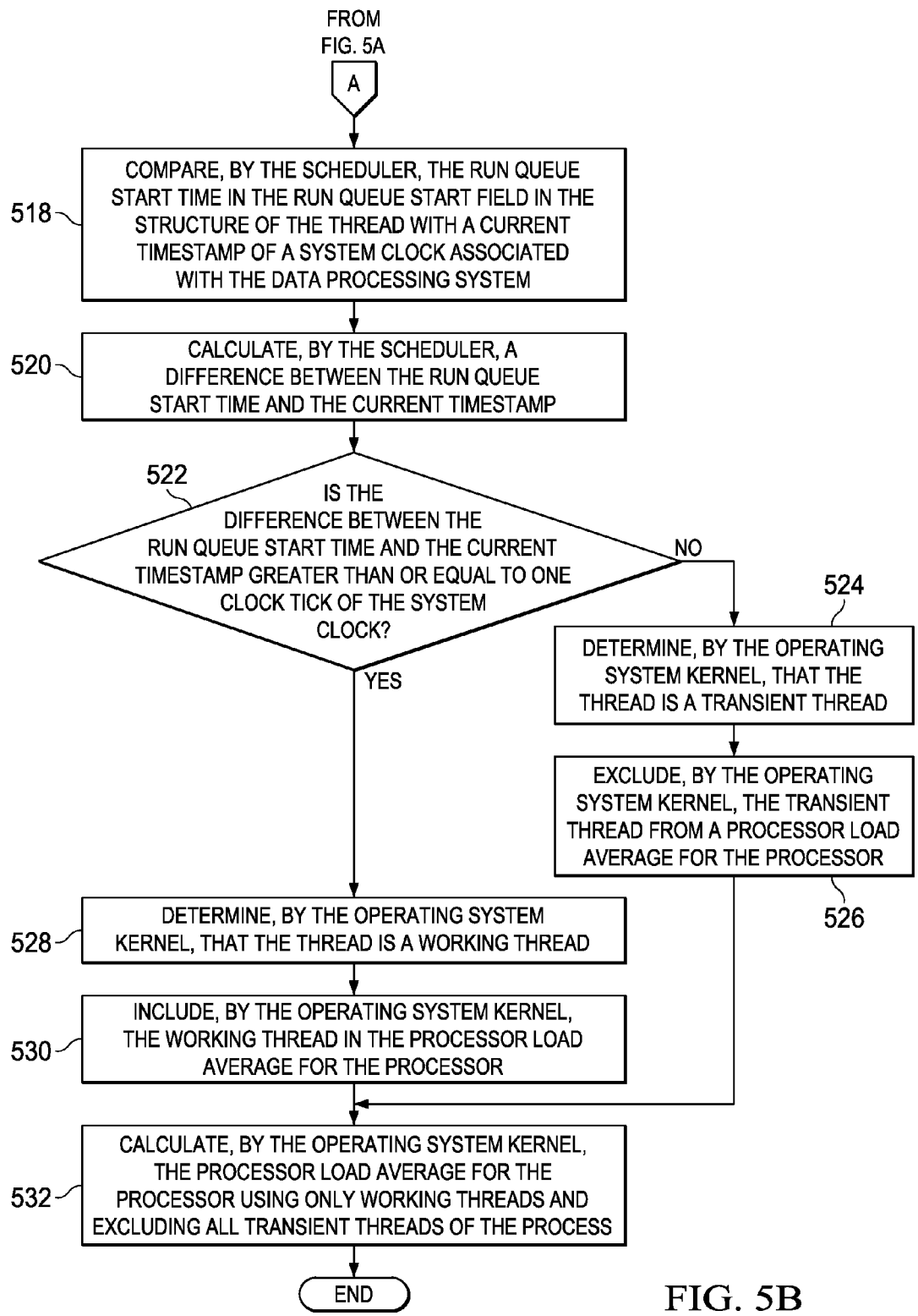

With reference now to FIGS. 5A and 5B, a flowchart illustrating a process for calculating a processor load is shown in accordance with an illustrative embodiment. The process shown in FIGS. 5A and 5B may be implemented in a data processing system, such as data processing system 100 in FIG. 1.

The process begins when an operating system kernel within the data processing system receives an input to schedule a thread of a process for execution by a processor coupled to the data processing system (block 502). The operating system kernel may, for example, be operating system kernel 120 in FIG. 1 and the processor may, for example, be one of the one or more processors of processor unit 104 in FIG. 1. In response to the operating system kernel receiving the input to schedule the thread for execution in block 502, a scheduler associated with the operating system kernel, schedules the thread for execution (block 504). The scheduler may, for example, be scheduler 122 of FIG. 1.

At block 506, the scheduler places the thread in a run queue that lists all threads ready to be dispatched for execution (block 506). The thread and the run queue may, for example, be thread 204 and run queue 202 in FIG. 2. In addition, the scheduler inserts a run queue start time field, such as run queue start time field 206 in FIG. 2, in a structure of the thread (block 508). Further, the scheduler sets a run queue start time in the run queue start field in the structure of the thread (block 510). The run queue start time may, for example, be run queue start time timestamp 208 in FIG. 2. Also, the run queue start time may, for example, be determined by a system clock, such as system clock 110 in FIG. 1.

At block 512, the scheduler makes a determination whether the thread was dispatched for execution (block 512). In response to a dispatcher associated with the operating system kernel dispatching the thread for execution, the dispatcher clears the run queue start time in the run queue start field in the structure of the thread (block 514). Clearing the run queue start time in the run queue start field means setting the run queue start time to zero, for example. In response to the scheduler determining that the thread was not dispatched for execution, the scheduler makes a determination as to whether a system timer expired (block 516).

In response to the system timer not expiring, no output of block 516, the process returns to block 512 where the scheduler determines whether the thread has been dispatched for execution. In response to the system timer expiring, yes output of block 516, the scheduler compares the run queue start time in the run queue start field in the structure of the thread with a current timestamp of a system clock associated with the data processing system (block 518). In response to the scheduler comparing the run queue start time with the current timestamp of the system clock in block 518, the scheduler calculates the difference between the run queue start time and the current timestamp (block 520).

In response to the scheduler calculating the difference between the run queue start time and the current timestamp in block 520, the scheduler makes a determination as to whether the difference between the run queue start time and the current timestamp is greater than or equal to one clock tick of the system clock (block 522). In response to the difference between the run queue start time and the current timestamp not being greater than or equal to one clock tick of the system clock, no output of block 522, the operating system kernel determines that the thread is a transient thread (block 524). As a result, the operating system kernel excludes the transient thread from a processor load average for the processor (block 526).

In response to the difference between the run queue start time and the current timestamp being greater than or equal to one clock tick of the system clock, yes output of block 522, the operating system kernel determines that the thread is a working thread (block 528). Consequently, the operating system kernel includes the working thread in the processor load average for the processor (block 530). At block 532, the operating system kernel calculates the processor load average for the processor using only working threads and excluding all transient threads for the process (block 532). The process terminates thereafter.

Thus, illustrative embodiments of the present invention provide a method, computer system, and computer program product for calculating a more accurate processor load average by identifying threads in a processor run-queue, which are active for only transient periods of time, and not including these identified transient threads in the processor load average calculation. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying a transient program thread, the method comprising:
a computer placing a scheduled program thread of a process in a run queue associated with a processor;
the computer adding, to the scheduled program thread, data indicating a time that the scheduled program thread was placed into the run queue;
in response to the scheduled program thread not being dispatched from the run queue for execution by the processor and an expiration of a system timer, the computer comparing the data that was added to the scheduled program thread indicating the time the scheduled program thread was placed into the run queue with a current timestamp of a system clock associated with the computer when the system timer expired to determine whether the scheduled program thread is a working program thread or the transient program thread; and
in response to a difference between the data that was added to the scheduled program thread indicating the time the scheduled program thread was placed into the run queue and the current timestamp of the system clock being less than one clock tick of the system clock when the system timer expired, the computer identifying the scheduled program thread as the transient program thread and excluding the transient program thread from a calculation of an average processor load of the processor that is based on a number of working program threads in the run queue associated with the processor.

2. The method of claim 1 further comprising:
the computer determining whether a dispatcher dispatched the scheduled program thread from the run queue and is executing on the processor.

3. The method of claim 2 further comprising:
the computer, responsive to the scheduled program thread being dispatched from the run queue for execution by the processor, clearing the data that was added to the scheduled program thread indicating the time the scheduled program thread was placed into the run queue.

4. The method of claim 2 further comprising:
the computer calculating the difference between the data that was added to the scheduled program thread indicating the time the scheduled program thread was placed into the run queue and the current timestamp of the system clock when the system timer expired based on the comparison.

5. The method of claim 4 further comprising:
the computer determining whether the difference between the data that was added to the scheduled program thread indicating the time the scheduled program thread was placed into the run queue and the current timestamp of the system clock when the system timer expired is greater than or equal to one clock tick of the system clock.

6. The method of claim 5 further comprising:
the computer, responsive to the difference between the data that was added to the scheduled program thread indicating the time the scheduled program thread was placed into the run queue and the current timestamp of the system clock being greater than or equal to one clock tick of the system clock when the system timer expired, identifying the scheduled program thread as the working program thread and including the working program thread in the calculation of the average processor load associated with the processor.

7. The method of claim 4 wherein at a clock tick of the system clock each scheduled program thread in processor run queues in the computer are examined and the data that was added to each scheduled program thread indicating the time that each scheduled program thread was placed into a processor run queue is compared against the current timestamp of the system clock.

8. The method of claim 1 further comprising:
the computer calculating the average processor load associated with the processor using only the working program threads and excluding all transient program threads of the process, wherein the transient program threads come out of a sleep mode to be active for a transient period of time that is less than one clock tick of the system clock and then go back to the sleep mode.

9. The method of claim 8 wherein the average processor load associated with the processor is a measure of an amount of work the processor performs over a predetermined time interval.

10. A computer system comprising one or more processors, one or more computer-readable memories, one or more computer-readable storage devices and program instructions which are stored on the one or more storage devices for execution by the one or more processors via the one or more memories and when executed by the one or more processors perform the method of claim 1.

11. A computer program product comprising one or more computer-readable storage devices and computer-readable program instructions which are stored on the one or more storage devices and when executed by one or more processors, perform the method of claim 1.

12. A computer system for identifying a transient program thread, the computer system comprising:
one or more processors, one or more computer-readable memories, one or more computer-readable storage devices, and program instructions, stored on at least one of the one or more storage devices for execution by at least one of the one or more processors via at least one of the one or more memories, the program instructions comprising:
program instructions to place a scheduled program thread of a process in a run queue associated with a processor;
program instructions to add, to the scheduled program thread, data indicating a time that the scheduled program thread was placed into the run queue;
program instructions to compare the data that was added to the scheduled program thread indicating the time the scheduled program thread was placed into the run queue with a current timestamp of a system clock associated with the computer when a system timer expired to determine whether the scheduled program thread is a working program thread or the transient program thread in response to the scheduled program thread not being dispatched from the run queue for execution by the processor and an expiration of the system timer; and
program instructions to identify the scheduled program thread as the transient program thread and exclude the transient program thread from a calculation of an average processor load of the processor that is based on a number of working program threads in the run queue associated with the processor in response to a difference between the data that was added to the scheduled program thread indicating the time the scheduled program thread was placed into the run queue and the current timestamp of the system clock being less than one clock tick of the system clock when the system timer expired.

13. The computer system of claim 12 further comprising:
program instructions to determine whether a dispatcher dispatched the scheduled program thread from the run queue and is executing on the processor.

14. The computer system of claim 13 further comprising:
program instructions to clear the data that was added to the scheduled program thread indicating the time the scheduled program thread was placed into the run queue in response to the scheduled program thread being dispatched from the run queue for execution by the processor.

15. The computer system of claim 13 further comprising:
program instructions to calculate the difference between the data that was added to the scheduled program thread indicating the time the scheduled program thread was placed into the run queue and the current timestamp of the system clock when the system timer expired based on the comparison.

16. A computer program product for identifying a transient program thread, the computer program product comprising:
one or more computer-readable storage devices, and program instructions, stored on at least one of the one or more storage devices, the program instructions comprising:
program instructions to place a scheduled program thread of a process in a run queue associated with a processor;
program instructions to add, to the scheduled program thread, data indicating a time that the scheduled program thread was placed into the run queue;
program instructions to compare the data that was added to the scheduled program thread indicating the time the scheduled program thread was placed into the run queue with a current timestamp of a system clock associated with the computer when a system timer expired to determine whether the scheduled program thread is a working program thread or the transient program thread in response to the scheduled program thread not being dispatched from the run queue for execution by the processor and an expiration of the system timer; and
program instructions to identify the scheduled program thread as the transient program thread and exclude the transient program thread from a calculation of an average processor load of the processor that is based on a number of working program threads in the run queue associated with the processor in response to a difference between the data that was added to the scheduled program thread indicating the time the scheduled program thread was placed into the run queue and the current timestamp of the system clock being less than one clock tick of the system clock when the system timer expired.

17. The computer program product of claim 16 further comprising:
program instructions to determine whether a dispatcher dispatched the scheduled program thread from the run queue and is executing on the processor.

18. The computer program product of claim 17 further comprising:
program instructions to clear the data that was added to the scheduled program thread indicating the time the scheduled program thread was placed into the run queue in response to the scheduled program thread being dispatched from the run queue for execution by the processor.

19. The computer program product of claim 17 further comprising:
    program instructions to calculate the difference between the data that was added to the scheduled program thread indicating the time the scheduled program thread was placed into the run queue and the current timestamp of the system clock when the system timer expired based on the comparison.

20. The computer program product of claim 19 further comprising:
    program instructions to determine determining whether the difference between the data that was added to the scheduled program thread indicating the time the scheduled program thread was placed into the run queue and the current timestamp of the system clock when the system timer expired is greater than or equal to one clock tick of the system clock.

21. The computer program product of claim 20 further comprising:
    program instructions identify the scheduled program thread as the working thread in response to the difference between the data that was added to the scheduled program thread indicating the time the scheduled program thread was placed into the run queue and the current timestamp of the system clock being greater than or equal to one clock tick of the system clock when the system timer expired; and
    program instructions to include the working program thread in the calculation of the average processor load associated with the processor.

22. The computer program product of claim 16 further comprising:
    program instructions to calculate the average processor load associated with the processor using only the working program threads and excluding all transient program threads of the process, wherein the transient program threads come out of a sleep mode to be active for a transient period of time that is less than one clock tick of the system clock and then go back to the sleep mode.

23. The computer program product of claim 22 wherein the average processor load associated with the processor is a measure of an amount of work the processor performs over a predetermined time interval.

* * * * *